Dec. 29, 1936.        A. F. GILLET        2,066,000

SUCTION ACTUATED WARNING MECHANISM

Filed Feb. 4, 1935

Inventor

A. F. Gillet.
Arthur H. Sturges  Attorney

Patented Dec. 29, 1936

2,066,000

UNITED STATES PATENT OFFICE 2,066,000

SUCTION ACTUATED WARNING MECHANISM

Alexis F. Gillet, Omaha, Nebr., assignor to E. A. Laboratories, Inc., Brooklyn, N. Y., a corporation of New York Application February 4, 1935, Serial No. 4,906

3 Claims. (Cl. 116—138)

This invention relates to suction actuated warning signals particularly adapted for use in conjunction with the internal combustion engines of automobiles, provided with intake manifolds and speed regulating throttle valves therefor, said manifolds having nipple-taps for connection to suction operated windshield wipers, defrosters and the like accessories.

The present invention contemplates the substitution of a two-way inlet or nipple for the above mentioned tap whereby one of the branches thereof may be attached to a windshield wiper or the like as heretofore, and the other branch connected to the warning signal of the present invention.

It is an object of the invention to provide a warning signal, the vibratable diaphragm of which is provided with such a comparatively restricted opening or openings therethrough that the combined area of said openings is of the same size or less than the area of the suction passageway or connection between the new device and the intake manifold of the engine or source of suction. Thus the warning signal of the present invention operates with a less or equal amount of volume of air than has heretofore been utilized for the operation of a windshield wiper or the like, it being well-known in the art that if too great a volume of air is sucked into the intake manifold incident to the operation of the accessory devices that the fuel mixture for the engine becomes diluted thereby to such an extent that the proper operation of the engine and vehicle is interfered with.

Another object of the invention is to provide a warning signal, the vibratable diaphragm of which is provided with such comparatively restricted openings that the passage of debris, abrasive sand particles and the like is prevented therethrough.

A further object of the invention is to provide a device for the above stated purposes, the diaphragm of which is so constructed that the opening or openings therethrough, as to the combined area of the openings, is comparatively restricted and of less area than the area of any portion of the connection between the intake manifold of the engine and said device; consequently, air incident to rushing through said restricted area of the diaphragm is thereby increased in velocity adjacent the diaphragm for a more effective vibration of the diaphragm and corresponding pulsations of the air in the horn portion of the new device for producing a more efficient and louder signalling sound for warning traffic of the approach of the vehicle.

The heretofore mentioned tap on the intake manifold is provided by the manufacturer thereof and is purposely made small for limiting the quantity of air admitted to the manifold therethrough for the prevention of a dangerous dilution of the fuel mixture for the engine. Thus, the volume of air admitted to said manifold through said tap is comparatively small and often inadequate for operating warning signals of the general class of the present device and it is an object of the present invention to so arrange the parts thereof so that the comparatively small quantity of air permitted to pass said tap causes a flow of the air adjacent the diaphragm of the present invention with such velocity as to provide for an efficient operation of the traffic warning device.

With the foregoing and other objects in view, the invention will be more fully described hereinafter and will be more particularly pointed out in the claims appended hereto.

In the drawing, wherein like symbols refer to like or corresponding parts throughout the several views.

Figure 1:
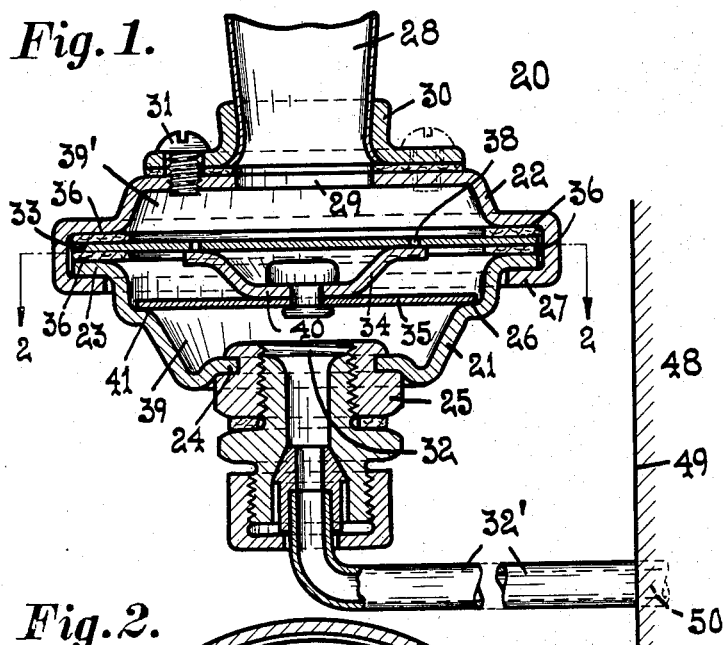
Figure 1 is a vertical section of a warning signal embodying the present invention and showing the diaphragm thereof in contact with the valve head.
Figure 2:
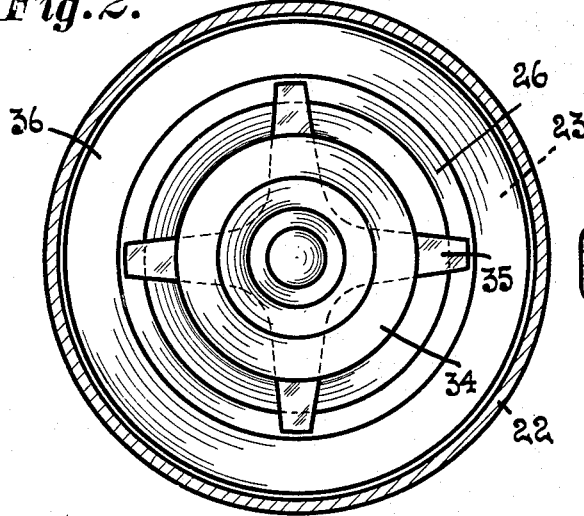
Figure 2 is a transverse section thereof taken on line 2—2 of Figure 1.

Referring now to the drawing for a more particular description, 20 indicates generally a warning signal which includes a casing that may include a lower half portion 21 and an upper half portion 22. Said lower part is substantially cup-shape in cross section, and may have an outturned flange 23 and an inturned flange 24. A nut 25 facilitates a connection of the warning signal with the intake manifold of an internal combustion engine, it being understood that a suitable cut-off cock, (not shown), is provided for use at times when it is desired not to produce warning sounds.

Between the flanges 23 and 24 a detent shelf 26 is provided for purposes later explained. The upper half portion 22 of the casing includes a flange 27 which engages the flange 23 of the lower half portion.

A bell or trumpet 28 may be employed for amplifying sounds produced by the warning signal. The outer end of the bell is in communication at all times with the exterior atmosphere and the inner end thereof is in communication with the interior of the casing through an opening 29 formed through the upper half portion 22 of the housing and providing an air intake port. The bell 28 may be removably secured to the casing by means of an annular boss or collar 30 and bolts 31. The nut 25 is provided with a threaded outlet port 32 for securing thereto a connection or communicating conduit 32'. The securing means between the outlet port or nut 25 and the pipe 32' may consist of any suitable parts such as a threaded sleeve, and a pack nut carried thereby for locking the end of the pipe 32' to said sleeve, as shown in Figure 1.

Figure 3:
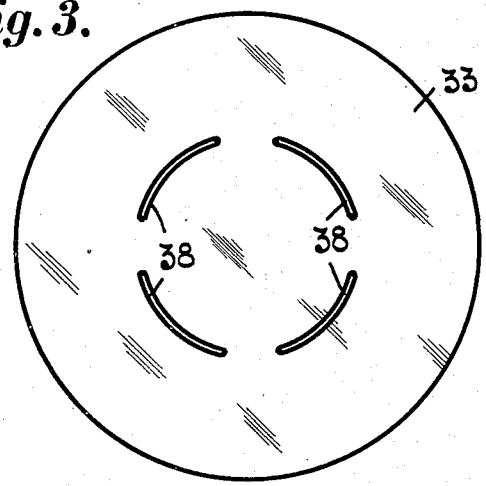
Figure 3 is a plan view of the diaphragm.
Figure 4:
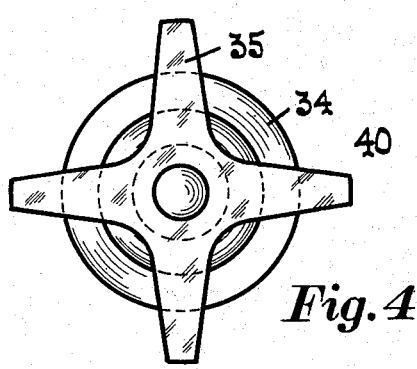
Figure 4 is a bottom plan view of the valve head.

Prior to securing the half portions of the housing together a transversely disposed diaphragm 33 and a valve head 34 carried by a resilient spider 35 are placed within the housing and arranged as shown in Figure 1. Also at that time shims 36, preferably formed of cardboard, fiber or the like, are positioned as shown. The diaphragm 33 is provided with a suitable number of apertures (for example, four) as shown at 38 in Figure 3. The diaphragm 33 sub-divides the casing and provides a chamber 39 at the suction side thereof, and a chamber 39' at the air inlet side thereof and it will be understood that communication between the chambers and with the exterior air is only permitted through the diaphragm opening or openings.

A valve head 40 is adapted to seat against and contact with the diaphragm at times, said head being secured by any suitable means such as a rivet or the like to a spider 35. The spider is formed of resilient material and has a suitable number of arms. The arms are similar and equidistantly spaced with respect to each other and radially disposed from a common center. As best shown in Figure 1, the outer ends of the arms rest upon the detent shelf 26 for a resilient bearing 41 and maintain the alignment of the valve head constant with respect to the diaphragm and assure an even contact between the surfaces thereof for closing and sealing the apertures 38.

A source of suction or engine is diagrammatically indicated at 48 provided with an intake manifold 49, the latter provided with the heretofore mentioned tap indicated at 50 to which is connected the conduit 32' for a communication of suction generated by the reciprocating pistons of the engine to the new device for an actuation thereof.

Between the ends of the conduit 32' a cut-off valve, (not shown), is provided for closing said passageway or connection 32' completely. Said cut-off valve may be of any type such as that illustrated and explained in my Prior Patent No. 1,869,142.

The combined area of the apertures 38 of the diaphragm is made less than the transverse area of the pipe or connection 32' or of the area of the tap 50 on the manifold whereby the comparatively small volume of air provided by the capacity or size of the tap 50 must be used advantageously.

It will be understood that the tap 50 provided by the manufacturer of the manifold is limited in size for the purposes heretofore mentioned and that the largest fitting or nipple which can be screwed into said tap is such that the capacity or bore through the nipple can be no larger than substantially .06201 square inch. Preferably twin warning horns are attached to said nipple for producing a dual tone employing two diaphragms in two casings. When dual horns are employed the width of each aperture 38 of the diaphragm in instances where four thereof are provided is .015 inch, the length of each aperture is .442 whereby the area of each aperture is .00663 square inch. The combined area of eight apertures used in two separate sound casings is .05304 square inch and the combined area of four apertures is .02652 square inch and of a less area than the bore through said nipple.

It will be understood that the foregoing is merely illustrative. If only one horn or one warning signal were employed, the manufacturer might enlarge the diaphragm opening somewhat or else might, to a greater or lesser extent, reduce the effective area of the tap and/or casing outlet. Conversely, if more than two horns are employed, the area of the tap and tube might be increased or else the area of the diaphragm openings might be diminished to a point at which such aggregate area would be less than the most constricted portions of the tube or tap.

In the operation of prior art devices the comparatively small amount of air sucked through them into an intake manifold and through a tap similar to the foregoing mentioned tap 50 caused a correspondingly small degree of suction to be applied within the chamber of their valve mechanisms, the latter being expanded for providing adequate room for said valve. This decreased the velocity therethrough to such an extent that a proportionately lesser amount of vibrations were imparted to the diaphragms of the mechanism and weak signals generated thereby.

Signals of such a nature are, of course, unsatisfactory, and with this in mind it has heretofore been the practice to increase the area of the valve openings to a point at which they were materially in excess of the most constricted portion of the passageway extending from the source of vacuum to the warning mechanism. To insure operation of the parts under such conditions, it has been customary to interpose a tank into such passageway with a tube of adequate area extending from the warning mechanism to the tank. Accordingly, under motor operation a vacuum has been built up within the tank, and in certain instances a check valve has been interposed between the intake manifold and the tank to prevent any flow of fluid from such manifold to the tank in the event that the degree of vacuum in the former should, under operating conditions, be less than the degree of vacuum in the tank. A valve has also been arranged between the tank and the warning mechanisms. When this valve has been opened, the vacuum existing in the tank has acted to cause a major rush of air through the mechanism of the warning device or devices and with satisfactory operation of the latter. However, frequently repeated operations of the warning signals have been impossible because one must allow for a sufficient interval of time for the building up of a proper vacuum within the tank in order to insure of a proper operation on the part of the signal mechanism. Apparatus of this nature has also offered the objections that, first, it adds to the cost; second, it is relatively cumbersome and there is usually not adequate space for its proper installation; third, when installed it renders some parts of the motor relatively inaccessible; and, fourth, it adds to the danger of air leaks occurring, aside from the fact that the tank and its associated parts are liable to rattle.

In the operation of the instant invention, incident to the restricted passageway for air through the diaphragm thereof, a Venturi-tube-like action is provided which increases the velocity of the air passing through the diaphragm for more effective vibration and louder signals.

Substantially all warning signals are equipped with a screen extended across or within the bell of their mechanisms for preventing the entrance of debris and experience has taught that the finest screen which may be employed to practical purpose is substantially of .030 inch mesh in that a screen of finer mesh will mute or muffle sound emanating from the bell of the horn.

Among other advantages of the present invention it will be noted that particles of debris passing through the screen of the mesh stated cannot pass through the diaphragm unless said abrasive debris is less in diameter than the width of the apertures 38 or substantially .015 square inch.

It will be noted that a comparatively small amount of suction applied to the chamber 39 of the present invention is adequate to produce an efficient warning signal at all times during operation of the vehicle incident to the restricted opening through the diaphragm with respect to the connections between the new device and the intake manifold of the engine.

Figure 5:
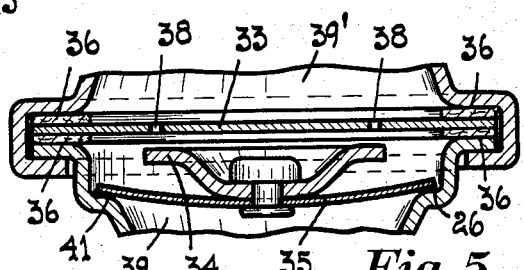
Figure 5 is a vertical section of a fragment of the signal and showing the relative position of the valve head and diaphragm during a cycle of operation.

Thus, when the source of vacuum is connected to the horn mechanism by the opening of a suitable valve, a suction is created within chamber 39. If a relatively flexible diaphragm is employed, the diaphragm will be flexed rearwardly. In such flexing the valve head also moves rearwardly. The diaphragm will finally move to a position at which it is fixed to its elastic limit. The air pressing against the outer face of the same and within chamber 39 will now flow through the opening or openings 38 and cause the valve head to move out of sealing relationship with respect to those openings. Thereupon the vacuum within chamber 39 will be relieved and the diaphragm will return to the position shown in Figs. 1 and 5, or may, in fact, flex outwardly beyond such positions. The valve head will thereupon be snapped forwardly under the influence of its resilient mounting, and due to such influence, may, in fact, contact the rear face of the diaphragm despite the fact that the opening through the casing outlet, the tube 32', and/or the tap, presents an area greater than the aggregate area of the slot or slots 38. The entire operation will thereupon be repeated. If the diaphragm is of a substantially rigid nature, or else is mounted in such fashion that it is incapable of flexing to a material extent, then upon suction being applied to chamber 39 the valve head will move out of sealing relationship with respect to the opening or openings 38. Due to its mass and the momentum with which it moves, such shifting of the valve head will occur with such vigor that it will move to a position beyond that which would represent a "balanced" condition. Such a condition has been generally illustrated in Fig. 5. Thereupon, under the influence of its resilient mounting the valve will move forwardly or outwardly and into contact with or substantially adjacent to the inner face of the diaphragm; these movements of the valve head being rapidly repeated.

In any event, and as a consequence of the foregoing cycles of operation, it will be seen that movements occur at acoustical frequencies and a warning tone is set up by one or any combination of the following factors: First, any flexing of the diaphragm will cause a corresponding movement on the part of the air column within the trumpet and which extends through the opening 29 into the chamber 39'; second, the valve head will strike against the rear face of the diaphragm; and/or, third, the movements of the valve head will repeatedly diminish if not cut off the flow of air through the openings 38, thus causing a pulsation of the air column and the consequent production of a warning note.

While the foregoing specification sets for the invention in specific terms, it is to be understood that various changes and modifications may be made in the details of construction and design without departing from the spirit thereof, such changes and modifications being restricted only by the scope of the following claims.

What is claimed is:—

1. A suction actuated warning mechanism including a casing having inlet and outlet ports, the latter to be connected to a source of suction, a vibratory diaphragm mounted within said casing and provided with a series of apertures arranged in the form of a circle, and a vibratory valve head disposed within said casing with its outer edges spaced from the inner casing faces and movable with respect thereto, said valve being movable with respect to said diaphragm to rapidly vary the flow of air through the apertures thereof.

2. A suction actuated warning mechanism including a casing having inlet and outlet ports, the latter to be connected to a source of suction, a vibratory diaphragm mounted within said casing and formed with a plurality of apertures each having an arcuate shape and a common radius, a vibratory valve disposed within said casing with its peripheral edges spaced therefrom and movable with respect thereto, means mounted by said casing and connected to said valve to constantly urge the same towards said diaphragm and into sealing contact with said apertures, said valve moving with respect to said diaphragm to rapidly vary the flow of air through the apertures thereof, and the combined area of said apertures unobstructed by said valve being less than the effective area of the outlet port of said casing.

3. A suction actuated warning mechanism including a casing having inlet and outlet ports, the latter to be connected to a source of suction, a vibratory diaphragm formed with an aperture and disposed within said casing at a point between said ports, a reciprocable valve body also disposed within said casing with its peripheral edges spaced from and movable with respect to said casing, said body being disposed wholly between said diaphragm and the outlet port of said casing and cooperating with the diaphragm aperture to rapidly vary the flow of air therethrough, and the effective area of said outlet port being greater than the effective area of said diaphragm aperture when unobstructed by said valve body.

ALEXIS F. GILLET.